(12) United States Patent
Jardine et al.

(10) Patent No.: US 6,872,247 B1
(45) Date of Patent: Mar. 29, 2005

(54) AMINE-BASED, HEXAVALENT CHROMIUM REDUCING AGENTS FOR CEMENT

(75) Inventors: Leslie A. Jardine, Salem, MA (US); Charles A. Cornman, Maynard, MA (US); Felek Jachimowicz, Brookline, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/680,030

(22) Filed: Oct. 7, 2003

(51) Int. Cl.⁷ .............................. C04B 7/00; C04B 7/52; C04B 40/00
(52) U.S. Cl. .................. 106/808; 106/727; 106/823
(58) Field of Search .................... 106/808, 727, 106/823

(56) References Cited

U.S. PATENT DOCUMENTS

| | | | |
|---|---|---|---|
| 3,955,998 A | * 5/1976 | Clampitt et al. ........... | 252/8.05 |
| 4,333,764 A | * 6/1982 | Richardson ................ | 106/673 |
| 4,367,213 A | 1/1983 | Fiorucci et al. ............. | 423/607 |
| 5,224,595 A | * 7/1993 | Sugimoto et al. ........... | 206/321 |
| 5,834,079 A | 11/1998 | Blinka et al. ............... | 428/35.7 |
| 6,048,393 A | * 4/2000 | Cheung et al. ............. | 106/727 |
| 6,740,150 B2 | * 5/2004 | Munteanu et al. ....... | 106/14.13 |

FOREIGN PATENT DOCUMENTS

| | | | |
|---|---|---|---|
| DE | 102 61 076 A1 | 12/2002 | ........... C04B/41/63 |
| EP | 0 960 865 A1 | 12/1999 | ........... C04B/24/18 |
| WO | WO 00/06517 | 2/2000 | ........... C04B/24/40 |

* cited by examiner

Primary Examiner—Elizabeth D. Wood
(74) Attorney, Agent, or Firm—Craig K. Leon; William L. Baker

(57) ABSTRACT

Methods and compositions involving hexavalent chromate-reducing agents, particularly hydroxylamine, hydrazine, or their salts or derivatives, for use in cement compositions and cement processing.

24 Claims, No Drawings

AMINE-BASED, HEXAVALENT CHROMIUM REDUCING AGENTS FOR CEMENT

FIELD OF THE INVENTION

This invention relates to compositions and methods for reducing hexavalent chromium in cement compositions, and more particularly to the use of a certain hydroxylamine, hydrazine, or the salt or derivative thereof.

BACKGROUND OF THE INVENTION

Chromium is an unavoidable trace element of the raw material used in the manufacture of cement clinker. In the oxidizing and alkaline burning conditions of the cement kiln, hexavalent chromium (CrVI) may form. Hexavalent chromium is a powerful dermal irritant that is considered extremely toxic due to its high oxidation potential and ability to penetrate human tissue. It can cause skin sensitization, allergic reactions, and eczema. Chromium VI has high solubility in water and is released when cement is mixed with water. Thus, wet cement poses a health issue for workers who come into contact with wet cement or concrete.

Currently, the typical approach is to employ ferrous (iron II) sulfate to reduce hexavalent chromium (CrVI) to trivalent chromium (CrIII), which tends to precipitate from solution, thereby posing a much reduced risk as a dermal irritant.

Moreover, the use of ferrous sulfate is not efficient because the dosage amount required for reducing CrVI to CrIII is at least ten times the stoichiometric amount of ferrous sulfate otherwise required. The poor dosage efficiency is explained partly by the fact that ferrous sulfate readily oxidizes, from Iron (II) to Iron (III), during prolonged contact with air and water. This poor storage stability decreases the efficiency of ferrous sulfate, and can render it useless as a chromate reducer if not used quickly.

As mentioned in U.S. Pat. No. 4,784,691, the decrease in the ferrous (II) sulfate chromate-reducing ability may be avoided, or to some extent diminished, if the ferrous sulfate is used in the form of particles coated with an oxidation-preventing material. An inevitable disadvantage of this coating process, of course, is that added expense and further process steps are required. Also, it appears from Example 1 in the '691 patent that up to 30 times the stoichoimetric amount of ferrous sulfate is required.

Furthermore, problems arising from the use itself of ferrous sulfate are not necessarily avoided or diminished by further processing. Such problems include the likelihood that ferrous sulfate, particularly when used in amounts in excess of one half percent by weight cement, create an increased water demand and extended setting time in the cement. Moreover, when used in a dry powder form, ferrous sulfate is difficult to interblend uniformly within the cement, and this is another factor explaining its high dosage requirement.

A still further problem with ferrous sulfate is that its dosage efficiency decreases drastically at higher temperatures (e.g., 80° C. or above) and high humidity levels. This will often be the case when cement clinker is interground to produce cement. Because intergrinding is the preferred method for combining materials at a cement manufacturing plant, the ferrous sulfate will need to be incorporated at levels that are up to three times the amount typically required for interblending, thus making this method uneconomical.

In view of these concerns, novel methods and compositions are needed for reducing hexavalent chromium to trivalent chromium, particularly in cementitious compositions and materials.

SUMMARY OF THE INVENTION

In surmounting the difficulties and problems of the aforementioned prior art, the present invention provides novel methods and compositions for reducing hexavalent chromium in cementitious compositions.

Compositions and methods of the invention involve the use of certain hydroxylamines, hydrazines, or the salts or derivatives thereof. En exemplary method for reducing hexavalent chromium in cementious compositions comprises: combining a cement and a reducing agent selected from the group consisting of (A) a hydroxylamine or the salt or derivative thereof, the hydroxylamine having a structure represented by the formula

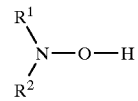

wherein $R^1$ and $R^2$ each comprise a hydrogen or $C_1$–$C_{18}$ alkyl, alkene, or aryl group; and (B) a hydrazine or the salt or derivative thereof, the hydrazine having a structure represented by the formula

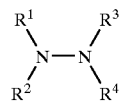

wherein $R^1$, $R^2$, $R^3$, and $R^4$ each comprise a hydrogen or $C_1$–$C_{18}$ alkyl, alkene, or aryl group.

Exemplary hydroxylamine salts include hydroxylamine hydrochloride ($NH_2OH \cdot HCl$) and hydroxylamine sulfate (($NH_2OH)_2 \cdot H_2SO_4$); while exemplary hydrazine salts include hydrazine hydrochloride ($N_2H_4 \cdot HCl$ or $N_2H_4 \cdot 2HCl$) and hydrazine sulfate ($N_2H_4 \cdot H_2SO_4$).

The reducing agents of the invention are preferably used in the amount of 10–3000 ppm based on weight of cement.

Preferably, the hydroxylamine, hydrazine, or its salt or derivative is combined with cement clinker during the intergrinding of clinker to produce cement. Optionally, this may be done with at least one conventional cement additive, such as a triethanolamine, a triisopropanolamine, tetrahydroxylethylethylene diamine, diethyleneglycol, water reducers, chloride ions, and others.

The present invention also provides additive compositions for use in cement production, as well as admixtures for combining with finished cement, mortars, and concretes.

In comparison with ferrous sulfate, the hydroxylamine salts and hydrazine salts of the present invention provide chromate-reducing advantages, particularly in terms of dosage efficiency, storage stability, and operability at higher temperatures (e.g., above 80° C.). They are also believed to have less of a set-accelerative effect on cement.

Other advantages and features of the invention are described in further detail hereinafter.

DETAILED DESCRIPTION OF EXEMPLARY EMBODIMENTS

Portland cement clinker is prepared by sintering a mixture of components including calcium carbonate (as limestone), aluminum silicate (as clay or shale), silicon dioxide (as sand) and miscellaneous iron oxides. During the sintering process, chemical reactions take place in which hardened nodules, commonly called "clinkers," are formed. After the clinker has cooled, it is pulverized together with a small amount of gypsum (calcium sulfate) in a finish grinding mill to provide a fine, homogeneous powdery product known as Portland cement.

Thus, an exemplary method of the invention comprises introducing to cement, such as by adding to cement clinker during the intergrinding thereof to produce cement, a CrVI reducing agent selected from the group consisting of a hydroxylamine, hydrazine, or the salt or derivative thereof. Preferably, the CrVI reducing agent is present in an amount of 10–5000 ppm by weight of cement, and more preferably in an amount of 100–1000 ppm by weight of cement. The CrVI reducing agent may be used as a dry powder or in a fluid (e.g., aqueous) form.

Cementitious compositions prepared by processes of the invention thus comprise primarily cement made from cement clinker. Accordingly, such compositions preferably have at least 40% by weight of Portland cement, and more preferably at least 80% by weight. Secondary argillaceous or pozzolanic materials may also be mixed with the cement clinker, such as clay, natural pozzolan, flyash, limestone, granulated blast furnace slag, or a mixture thereof, to provide a hydratable cementitious composition.

It is believed that the cement processing aid compositions of the present invention, and processes employing such compositions, are suitable for use in conventional cement grinding mills, including, without limitation, ball mills, and mills having rollers. For example, grinding processes involving two or more opposed rollers, as well as rollers used on circular tables, are contemplated herein. Preferably, the intergrinding occurs at a temperature in the range of 80° C.–140° C.

An exemplary method of the invention thus comprises combining a cement with a CrVI reducing agent selected from the group consisting of a hydroxylamine, a hydrazine, or the salt or derivative thereof.

Without being bound to theory, the Applicants believe that the mechanism of CrVI reduction by hydroxylamine occurs in accordance with equation 1 set forth below. This reaction is based on the half-cell reductions shown in equations 2 and 3, set forth below, under alkaline conditions. See e.g., Deane, J. A., *Lange's Handbook of Chemistry*, 14$^{th}$ Ed., Donnelley and Sons, 1992, section 8.6; See also Jones, K. "Nitrogen" in *Comprehensive Inorganic Chemistry*; Bailar, J. C.; Emeleus, H. J.; Nyholm, R.; Trotman-Dickenson, A. F., Eds.; Pergamon Press, 1973, pp. 262–273. The formal potential for this reaction is +0.6V, which suggests that the reaction of equation 1, with its negative free energy, is spontaneous. Similar reaction dynamics can be surmised for hydrazine (half-cell equation 4, Jones, K., sura).

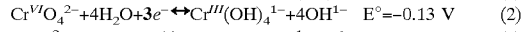
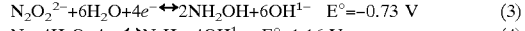
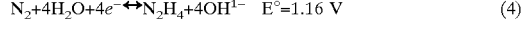

$4Cr^{VI}O_4^{2-}+6NH_2OH+2OH^{1-} \leftrightarrow 4Cr^{III}(OH)_4^{1-}+3N_2O_2^{2-}+2H_2O$ (1)

$Cr^{VI}O_4^{2-}+4H_2O+3e^- \leftrightarrow Cr^{III}(OH)_4^{1-}+4OH^{1-}$  $E°=-0.13$ V (2)

$N_2O_2^{2-}+6H_2O+4e^- \leftrightarrow 2NH_2OH+6OH^{1-}$  $E°=-0.73$ V (3)

$N_2+4H_2O+4e^- \leftrightarrow N_2H_4+4OH^{1-}$  $E°=1.16$ V (4)

The mechanism for reaction with ferrous sulfate is probably similar with a similar thermodynamic driving force (half-ell equation 5). However, ferrous ion has several characteristics in alkaline solution that make it less attractive as a candidate for chromate reduction. First, ferrous ion has very low solubility in alkaline solution ($Fe^{II}(OH)_2$; $K_{sp}=$ 4.87×10$^{-17}$; See e.g., RC Handbook of Chemistry and Physics, 8–112).

Second, ferrous ion is known to react rapidly with oxygen to form ferric ion under alkaline conditions. (See e.g., Cotton, F. A.; Wilkinson, G., *Comprehensive Inorganic Chemistry*, 4$^{th}$ Ed. John Wiley and Sons, 1980, p 490.) The inventors suggest that hydroxylamine is both more soluble and less reactive toward oxygen under alkaline conditions, and is therefore more suited as a reducing agent for chromate VI in cement.

$Fe^{III}(OH)_4^{1-}+1e^- \leftrightarrow Fe^{II}(OH)_4^{2-}$  $E°=-0.73$ V (5)

It is further possible that the hydroxylamine can coordinate to the chromate ion, thereby facilitating the reduction of CrVI to CrII. It has been suggested that substituted phenols work through this mechanism. See e.g., Elovitz, Michael S., and Fish, William, "Redox Interactions of Cr(VI) and Substituted Phenols: Products and Mechanism", Environmental Science and Technology 1995, page 29 (1933–1943).

Exemplary hydroxylamines suitable for use as a chromium VI reducing agent in the present invention are represented by the formula $R_2N$—OH; while hydrazines are represented by the formula $R_2N$—$NR_2$. In either case, the R groups can be hydrogen or a $C_1$–$C_{18}$ alkyl, alkene, or aryl group, or mixtures thereof. For example, in the hydroxylamine or its salt, one of the two "R" groups may be hydrogen while the second of the "R" groups is an alkyl group. An example of such a preferred hydroxylamine is isopropylhydroxylamine, which has the general formula $C_3H_7NH$—OH. In further exemplary hydroxylamine, the two "R" groups can both be alkyl groups, such as in diethylhydroxylamine which was the general formula $(C_2H_5)_2N$—OH. Preferably, methods and compositions of the present invention involve isopropylhydroxylamine, diethylhydroxylamine, or, as further discussed in the next paragraph, a salt thereof.

Further exemplary reducing agents comprise a salt of the hydroxylamine or hydrazine. Exemplary hydroxylamine salts include hydroxylamine (hydro)chloride ($NH_2OH.HCl$), hydroxylamine formate ($NH_2OH.HCO_2H$), hydroxylamine phosphate (($NH_2OH)_3.H_3PO_4$), hydroxylamine nitrate ($NH_2OH.HNO_3$), hydroxylamine nitrite ($NH_2OH.HNO_2$), hydroxylamine oxalate ($NH_2OH.HO_2CCO_2H$), hydroxylamine acetate ($NH_2OH.CH_3CO_2H$)hydroxylamine sulfate (($NH_2OH)_2.H_2SO_4$), and others. Exemplary hydrazine salts similarly include hydrazine (hydro)chloride (e.g., $N_2H_4.HCl$ or $N_2H_4.2HCl$), hydrazine formate ($N_2H_4.HCO_2H$), hydrazine phosphate ($N_2H_4.½H_3PO_4$), hydrazine acetate ($N_2H_4.CH_3CO_2H$), hydrazine nitrate ($N_2H_4.½HNO_3$), hydrazine sulfate ($N_2H_4.H_2SO_4$) and others.

Still further exemplary reducing agents may include derivatives of hydroxylamine, hydrazine, or their salts. For example, the derivative could be the reaction product of a hydroxylamine or hydrazine with the carbonyl group of an aldehyde ($H_2C$=O or RHC=O) or ketone (RRC=O). This would convert the hydroxylamine (e.g., $R_2N$—OH, RHN—OH, etc.) to an oxime (e.g., >C=N—OH) or the hydrazine (e.g., $R_2N$—N $R_2$, RHN—NHR, etc.) to a hydrazone (e.g., >C=N—$NR_2$, >C=N—NHR, etc.). Accordingly, exemplary reducing agents of the invention may also include oxime (e.g., aldoxime) and hydrazone. An additional exemplary derivative of hydroxylamine is the reaction product with carboxylic acid, hydroxamic acid. An exemplary derivative of hydrazine is the reaction product with carboxylic acid.

As used herein the term "cement additive" is used to refer to a composition, containing a hydroxylamine, hydrazine, or salt or derivative of hydroxylamine or hydrazine, used for modifying a cement, such as during the intergrinding of cement clinker to produce Portland cement. The term "admixture" is used to refer to a composition that is combined with the finished (Portland) cement, with or without aggregates. For example, a "mortar admixture" is one that is added to cement and fine aggregate (sand), while a "concrete admixture" is one that is added to a combination of cement, fine aggregate (sand), and coarse aggregate (crushed gravel, stones). Thus, the present invention also provides additive and admixture compositions.

Thus, further exemplary compositions and methods of the invention may further comprise at least one conventional cement additive or concrete admixture, in addition to the above-described hydroxylamine, hydrazine, or salt or derivative thereof. Additional conventional cement additives may be used, for example, in an amount of 0.01–1.0% s/s cement. Exemplary additional cement additives may include, but not be limited to, tetrahydroxylethylethylene diamine ("THEED"), an alkanolamine such as triethanolamine ("TEA") or triisopropanolamine ("TIPA"), a glycol (such as diethylene glycol), or mixture thereof. THEED was described, along with similar derivatives of ethylene diamine, in French Patent Application No. FR2485949A1 as an agent for enhancing the strength of cement cured products, such as mortar and concrete, in which portland cement, blended cement, etc., has been used.

Another exemplary additional cement additive contemplated for use in the present invention is poly (hydroxyalkylated) polyethyleneamine, poly(hydroxyethyl) polyethyleneimine, as disclosed in U.S. Pat. No. 4,401,472. The use of this additive in cement grinding or as admixtures in concrete, including hydraulic cement, aggregate, and water, would enhance strength. See also U.S. Pat. No. 5,084,103 (disclosing triisopropanolamine and other trialkanolamines used as strength enhancing additives for later age strength (7–28 days) in cement grinding); See also U.S. Pat. No. 6,290,772 (disclosing hydroxylamines including N,N-bis(2-hydroxyethyl)-2-propanolamine and N,N-bis(2-hydroxypropyl)-N-(hydroxyethyl)amine, to enhance compressive strength).

Other additional additives or admixtures can include known materials used for processing cement or modifying concretes or mortars, such as early compressive strength enhancers, grinding aids, set retarders, set accelerators, corrosion inhibiting agents, anti-foaming agents, air entraining ("AE") agents, water-reducing agents, AE/water-reducing agents, high-performance water-reducing agents (such as polycarboxylate comb polymers), high-performance AE water-reducing agents, fluidizers, agents to reduce segregation, set accelerators, antifreezing agents, cold-resisting agents, shrink reducing agents, heat of hydration inhibitors, and alkali aggregate reaction inhibitors.

Exemplary additional additives and admixtures may include an amine, alkanolamine, acrylic acid or salt thereof, glycol, glycerol, acetate salt, a phenol, chloride salt, sugar, or combination thereof. The amounts of such additives and/or admixtures can be used in accordance with conventional practice.

In further exemplary embodiments, oxygen scavengers may be used to accelerate the rate at which the hydroxylamine and/or hydrazine CrVI reducing agents function. For example, quinone compounds have been known for improving the reducing kinetics of hydrazine, as taught in U.S. Pat. No. 4,367,213. It is believed that hydroquinones will be useful for improving the reducing kinetics of hyroxylamines as well. Other oxygen scavengers contemplated for use in the invention include ascorbic acid (or salt thereof), sodium sulfite, sodium bisulfite, butyl hydroxytoluene, and 4-methoxyphenol.

Accordingly, further exemplary methods of the invention comprises combining a cement with (1) a hydroxylamine, hydrazine, or the salt or derivative thereof, as mentioned above, with (2) an oxygen scavenger selected from the group consisting of an ascorbic acid or salt (e.g., ascorbate); an isoascorbic acid or salt (e.g., isoascorbate); a sulfite; an ascorbate with a transition metal catalyst, the catalyst comprising a simple metal or salt, or a component, complex or chelate of the transition metal; a transition metal complex or chelate of a polycarboxylic acid, salicylic acid, or polyamine; a reduced form of quinone (e.g., hydroquinone, methylhydroquinone, etc.), a photoreducible dye, or a carbonyl compound which has absorbence in the UV spectrum; and tannin.

Oxygen scavengers may be used in the amount of 0.0005 to 5 times the weight of the hydroxylamine or hydrazine compound. The lower part of this range is particularly suitable for quinone type compounds, while the higher part of this range is believed to be more suitable for compounds such as the ascorbates which also function as reducing agents.

Certain metal chelating agents are also believed to be suitable for accelerating the CrVI reduction by hydroxylamine, hydrazine, or their salts or derivatives. For example, ethylenediaminetetraacetic acid (EDTA) or its salt are also believed to accelerate the reducing activities of hydroxylamine and hydrazine on chromium VI. See e.g., David Durham, Role of Mixed-Ligand Complex Formation in the Reduction of Chromium (1970). Thus, further exemplary compositions of the invention can include a chromium VI reducing accelerating agent. It is believed that of the metal chelating agents that function to accelerate CrVI reduction, these operate to decrease metal based catalytic decomposition of hydroxylamines and hydrazines. Further chelating agents that are believed to be suitable for use in the present invention include nitriloacetic acid or its salt (which is often used as a substitute for EDTA), and ethyleneglycol-bis(beta-amino-ethyl ether)-N,N tetracetic acid or its salt.

Chelating agents may be used in the amount of 0.0005 to 0.5 times the weight of the hydroxylamine or hydrazine compound. Lower amounts are preferable.

Further exemplary methods of the invention thus involve combining said cement, said hydroxylamine and/or hydrazine (or salt or derivative thereof); and at least one oxygen scavenger, metal chelating agent, or mixture thereof.

The following examples are provided for illustrative purposes only and are not intended to limit the scope of the invention.

EXAMPLE 1

Testing of Hydroxylamine and its Salts

Cement pore water was obtained by creating a cement paste with a cement to water ratio of 2:1. After 9 minutes of mixing, the cement paste is allowed to sit until it is aged for a total of 30 minutes. The paste is centrifuged, and the supernate is decanted, and filtered to obtain the pore water.

The level of (soluble) CrVI in cement pore water is measured by a commercial method available from Merck using Reflectoquant™ test strips and Reflectoquant™ RQflex meter. Description of the principle of the method from the manufacturer is as follows: "In acidic solutions, chromate is reduced to CrIII by reacting with diphenylcarbazide. The resultant diphenylcarbazone reacts with CrIII to form a red-violet complex, the concentration of which is determined reflectometrically." This method is based on Danish Standard DS 1020 "Test Method for Water Soluble Chromate in Cement."

The effectiveness of hydroxylamine on reducing CrVI in the cement was evaluated by adding a 50% hydroxylamine solution to the mix water during the production of the cement paste. This material effectively reduced soluble CrVI with a dosage requirement of less than 300 parts per million (hereinafter "ppm") hydroxylamine. Progressively higher amounts of hydroxylamine were seen to reduce progressive amounts of CrVI in the solution. The results are shown in Table 1. Two different experiments were performed on different types of cement: one involved Ordinary Portland Cement (OPC); the other involved slag cement.

Further exemplary embodiments of the invention may comprise another hexavalent chromium reducing agent, such as sodium bisulfite, ascorbic acid or its salt, iron sulfate, tin sulfate, or manganese sulfate. Amounts of the additional reducing agents can vary between 10 and 10,000 ppm by mass based on weight of cement.

TABLE 1

Measurement of CrVI in pore water of cement paste

| Type I OPC | | Slag cement | |
| --- | --- | --- | --- |
| Added Hydroxylamine Ppm | Measured CrVI Ppm | Added Hydroxylamine ppm | Measured CrVI Ppm |
| 0 | 10 | 0 | 10 |
| 100 | 3 | 100 | 5 |
| 300 | 1 | 300 | 1 |
| 600 | <1 | 600 | <1 |

EXAMPLE II (Testing of Hydroxylamine Salt)

This example pertains to the testing of hydroxylamine salts, which are preferred in the present invention because they are less volatile due to their higher boiling points, when compared with hydroxylamine ($NH_2OH$). Solutions of hydroxylamine hydrochloride and hydroxylamine sulfate were evaluated by adding these to mix water during the production of the cement paste (using OPC), and then centrifuging the pastes, decanting, and filtering the supernate to obtain the cement pore water. Thus, cement paste pore water samples were obtained for two different salts, and both were found to reduce soluble CrVI at dosages of several hundred ppm, as shown in Tables 2 and 3 below.

TABLE 2

Measurement of Cr(VI) in pore water of cement paste

| Added Hydroxylamine Hydrochloride Ppm | measured CrVI ppm | equivalent hydroxlamine ppm |
| --- | --- | --- |
| 0 | 10 | |
| 107 | 5 | 51 |
| 207 | 4 | 99 |
| 314 | 3 | 150 |

TABLE 3

Measurement of Cr(VI) in pore water of cement paste

| Added Hydroxylamine Sulfate Ppm | measured CrVI Ppm | equivalent hydroxlamine ppm |
| --- | --- | --- |
| 0 | 10 | |
| 81 | 9 | 33 |
| 301 | 7 | 121 |
| 602 | 2 | 242 |

EXAMPLE III

This example pertains to the testing of a reaction product of hydroxylamine(reacted 1:2 by weight with a high dextrose corn syrup to form an oxime in dquilibrium with the corn syrup and hydroxylamine. A solution of the hydroxylamine was evaluated by adding these to mix water during the production of the cement paste (using OPC), and then centrifuging the paste, decanting, and filtering the supernate to obtain the cement pore water. The level of (soluble) Chromate VI in cement pore water was measured. This reaction product was found to reduce chromium at several hundred ppm hydroxylamine as shown in table 4.

TABLE 4

Measurement of Cr(VI) in pore water of cement paste Type I OPC

| Added Dextrose:Hydroxylamine 2:1 Ppm | measured CrVI ppm | equivalent Hydroxylamine Ppm |
| --- | --- | --- |
| 0 | 10 | 0 |
| 163 | 9 | 52 |
| 326 | 3 | 103 |
| 652 | <1 | 207 |

The inventors believe that other salts and derivatives of hydroxylamine and hydrazine may achieve the same effect. These can include, but are not limited to, n-isopropylhydroxylamine, diethylhydroxylamine, hydroxylamine phosphate, hydroxylamine formate, derivatives (or adducts) of hydroxylamine formed by reacting carbonyl groups of aldehydes or ketones or carboxylic acid to produce oximes and aldoximes and hydroxamic acids, and derivaties (or adducts) of hydrazine formed by reacting carbonyl groups of aldehydes or ketones to produce hydrazone.

EXAMPLE IV

As mentioned previously, an additive to reduce chromium VI must be storage stable in cement after intergrinding under oxidizing conditions. Hydroxylamine chloride was interground in a Type I cement clinker and gypsum and subjected to heat treatment up to 180 C to accelerate decomposition of the active agent. Cement paste was then prepared with these cements (with or without heat treatment) containing various amounts of solutions of hydroxylamine hydrochloride. Cement paste was centrifuged. The supernate was decanted and filtered to obtain the cement pore water. The level of (soluble) Chromate VI in cement pore water was measured. Effectiveness was maintained at 100 and 300 ppm hydroxylamine equivalent. The results are illustrated in Table 5 below.

TABLE 5

U.S. Type I OPC

| Added Hydroxylamine Hydrochloride Ppm | no heating Measured CrVI ppm | Heat treated 180° C. for 2 hrs Measured CrVI ppm | equivalent hydroxylamine ppm |
|---|---|---|---|
| 0 | 4 | 5 | 0 |
| 106 | 4 | 5 | 50 |
| 211 | 3 | 3 | 100 |
| 634 | 1 | 1 | 300 |

EXAMPLE V (COMPARATIVE)

For comparison, a similar test was done on a different cement interblended (by post-grinding) with iron II sulfate. It was discovered that dosages of iron II sulfate in the range of 1000–3000 ppm lost effectiveness after heating, and that a dosage of 5000 ppm was required for sustained effectiveness. Dosages of 3000–5000 ppm were typically used to maintain effectiveness after storage. Results are shown in Table 6 below.

TABLE 6

UK Type I OPC

| Added Iron II Sulfate heptahydrate ppm | no heating Measured CrVI ppm | 180° C. for 2 hrs. Measured CrVI ppm |
|---|---|---|
| 0 | 10 | 10 |
| 1000 | 1 | 10 |
| 3000 | <<1 | 3 |
| 5000 | <<1 | 1 |

The foregoing illustrations and examples are provided for illustrative purposes only and not intended to limit the scope of the invention.

We claim:

1. A method for reducing hexavalent chromium in cementitious compositions, comprising:

combining with a cement clinker, during the intergrinding of the clinker to produce cement, a reducing agent selected from the group consisting of (A) a hydroxylamine having a structure represented by the formula

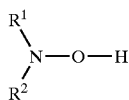

wherein $R^1$ and $R^2$ each comprise a hydrogen or $C_1$–$C_{18}$ alkyl, alkene, or aryl group, or a salt or derivative of said hydroxylamine; and (B) a hydrazine having a structure represented by the formula

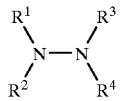

wherein $R^1$, $R^2$, $R^3$, and $R^4$ each comprise a hydrogen or $C_1$–$C_{18}$ alkyl, alkene, or aryl group, or a salt or derivative of said hydrazine;

wherein the amount of said reducing agent is no less than 10 ppm and not greater than 5000 ppm based on weight of cement.

2. The method of claim 1 wherein said reducing agent is hydroxylamine.

3. The method of claim 2 wherein, in said hydroxylamine, $R^1$ is hydrogen and $R^2$ is an alkyl group.

4. The method of claim 3 wherein said hydroxylamine is isopropylhydroxylamine having the formula $C_3H_7$—NH—OH.

5. The method of claim 2 wherein, in said hydroxylamine, $R^1$ and $R^2$ are alkyl groups.

6. The method of claim 5 wherein said hydroxylamine is diethylhydroxylamine having the formula $(C_2H_5)_2N$—H.

7. The method of claim 1 wherein said reducing agent is a hydroxylamine salt.

8. The method of claim 7 wherein said hydroxylamine salt is selected from the group consisting of hydroxylamine (hydro)chloride, hydroxylamine formate, hydroxylamine phosphate, hydroxylamine sulfate, hydroxylamine nitrite, hydroxylamine acetate, hydroxylamine oxalate, and hydroxylamine nitrate.

9. The method of claim 1 wherein said hydroxylamine salt is hydroxylamine formate.

10. The method of claim 1 wherein said reducing agent is hydroxylamine sulfate.

11. The method of claim 1 wherein said reducing agent is hydrazine chloride.

12. The method of claim 1 wherein said reducing agent is a hydrazine salt selected from the group consisting of hydrazine (hydro)chloride and hydrazine sulfate.

13. The method of claim 1 wherein said reducing agent is a derivative of hydroxylamine.

14. The method of claim 13 wherein said derivative of hydroxylamine is an oxime or aldoxime.

15. The method of claim 1 wherein said reducing agent is a derivative of hydrazine.

16. The method of claim 15 wherein said derivative of hydrazine is a hydrazone.

17. The method of claim 1 further comprising combining with the cement a cement additive selected from the group consisting of an amine, alkanolamine, acrylic acid or salt thereof, glycol, glycerol, acetate salt, a phenol, chloride salt, and sugar.

18. The method of claim 1 wherein said intergrinding occurs at a temperature no less than 80° C. and no greater than 140° C.

19. A cement composition made from the method of claim 1.

20. The composition of claim 19 further comprising a cement additive or concrete admixture selected from the group consisting of an amine, alkanolamine, acrylic acid or salt thereof, glycol, glycerol, acetate salt, a phenol, chloride salt, sugar, dispersants, lignins, air entraining surfactants, nitrite salts, and nitrate salts.

21. The composition of claim 20 further comprising an additional hexavalent chromium reducing agent.

22. The composition of claim 21 wherein said another hexavalent chromium reducing agent is selected from the group consisting of sodium bisulfite, ascorbic acid or its salt, iron sulfate, tin sulfate, and manganese sulfate.

23. A composition for adding to cement comprising: a reducing agent and, in addition to said reducing agent, a second cement additive;

said reducing agent selected from the group consisting of (A) a hydroxylamine having a structure represented by the formula

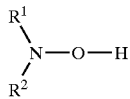

wherein $R^1$ and $R^2$ each comprise a hydrogen or $C_1$–$C_{18}$ alkyl, alkene, or aryl group, or a salt or derivative of said hydroxylamine; and (B) a hydrazine having a structure represented by the formula

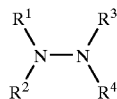

wherein $R^1$, $R^2$, $R^3$, and $R^4$ each comprise a hydrogen or $C_1$–$C_{18}$ alkyl, alkene, or aryl group, or a salt or derivative of said hydrazine; and, said second cement additive being selected from the group consisting of an amine, alkanolamine, acrylic acid or salt thereof, glycol, glycerol, acetate salt, a phenol, chloride salt, and sugar.

24. The method of claim 1 further comprising combining said cement with an additional component comprising an oxygen scavenger, a metal chelating agent, or a mixture thereof.

* * * * *